Dec. 24, 1963  R. CASAS-ROBERT ETAL  3,115,043
DEVICE FOR CHANGING THE RATIO AND THE DIRECTION OF
TRANSMISSION BETWEEN A DRIVING SHAFT AND A DRIVEN
SHAFT IN SEWING MACHINES
Filed Sept. 25, 1961  2 Sheets-Sheet 2

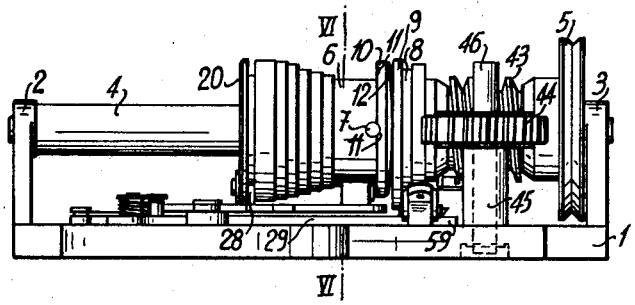

INVENTORS
RAMON CASAS-ROBERT
ROLANDO GIANINAZZI
By

United States Patent Office 3,115,043
Patented Dec. 24, 1963

3,115,043
DEVICE FOR CHANGING THE RATIO AND THE DIRECTION OF TRANSMISSION BETWEEN A DRIVING SHAFT AND A DRIVEN SHAFT IN SEWING MACHINES
Ramon Casas-Robert and Rolando Gianinazzi, both of Geneva, Switzerland, assignors to Mefina S.A., Fribourg, Switzerland, a corporation of Switzerland
Filed Sept. 25, 1961, Ser. No. 140,460
Claims priority, application Switzerland Sept. 26, 1960
4 Claims. (Cl. 74—124)

The present invention has for its object a device for changing the ratio and the direction of transmission between a driving shaft and a driven shaft in sewing machines such as described in our copending U.S. application Serial No. 136,240. According to this invention the driving of the driven shaft, in a direction opposed to that of the driving shaft, is effected in jerks by means of a ratchet mechanism. This mechanism comprises a block of eccentrics and cylindrical bearings mounted on the driving shaft, in such a manner as to be capable of sliding thereon while being secured angularly to the shaft. The eccentrics and cylindrical bearings are disposed in such a manner that one of their generatrices coincides. An operating member controls the axial movements of the said block, and a feeler member in mechanical connection with a pawl, is capable of following one or the other of the eccentrics, according to the axial position of the block. This action transmits to the pawl an oscillating movement of which the amplitude depends on the eccentricity of the particular eccentric in operation. The pawl, co-operating with a ratchet wheel, drives the driven shaft through the medium of gears, characterised in that it has two cylindrical concentric bearings, one being of larger diameter than that of the eccentrics. The diameter of this cylindrical bearing is selected in such a manner that when the feeler member co-operates therewith, the pawl occupies a position blocking the ratchet wheel. The second concentric cylindrical bearing is of a diameter larger than the first and is adapted to cause the withdrawal of the pawl relative to the ratchet wheel when the feeler member co-operates with this second cylindrical bearing. There is also provided rigidly coupling means for coupling said block with the ratchet wheel, which occurs when the block is moved into the axial position where the feeler member co-operates with the second cylindrical bearing. The cooperation of these members provides a direct transmission of power from the driving shaft to the driven shaft driven through the medium of said gears.

The device for the changing of the ratio and the direction of transmission defined above, is applicable to various uses, particularly in the art of sewing machines.

The accompanying drawings show diagrammatically and by way of example, one form of construction of the device according to the invention.

FIG. 1 is an elevational view of the device.

FIG. 2 is a plan view of the device in one position of operation, while

FIG. 6 is a section on the line VI—VI of FIG. 1.

Figure 3:
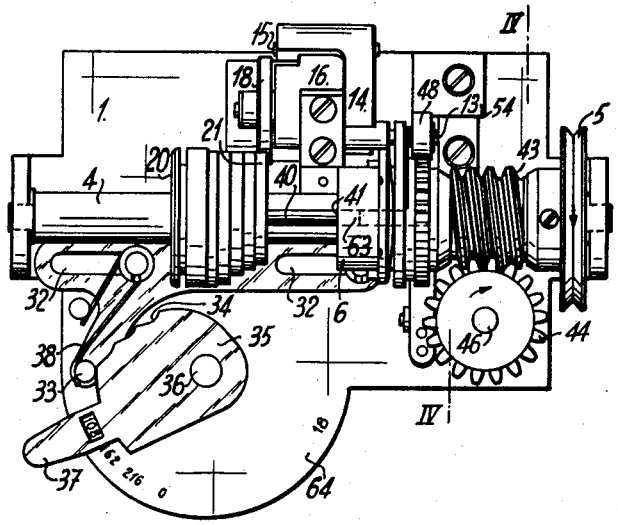
FIG. 3 is a view similar to FIG. 2 showing the device in another position of operation.

The device for changing the ratio and the direction of transmission between a driving shaft and a driven shaft is assumed to be mounted on a base plate 1 carrying two bearings 2 and 3 serving as support for a driving shaft 4 carrying a pulley 5 from which it may be driven, for example by a belt. A sleeve 6 is secured to this driving shaft 4 by means of a pin 7. This sleeve 6 has a collar 8. Around this sleeve 6 is engaged a link 9 which bears against the collar 8. A ring 10 is also engaged around the sleeve 6. This ring 10 has notches 11 of different depths, provided on one of its faces.

Between the ring 10 and the link 9 is placed an elastic washer 12. The ring 10 is adapted to be maintained in position by the pin 7 of which the extremities project from the sleeve 6 and engage in the notches 11. The selection of one or the other of the notches 11 of different depths permits of more or less adjusting the pressure exerted by the elastic washer 12 against the link 9.

The link 9 is hinged by a spindle 13 to an arm 14 which is hinged at 15 to a lever 16 pivoting at 17 on the base plate 1. The lever 16 carries a feeler roller 18 turning on the lever 16 by means of a spindle 19. The feeler roller 18 is adapted to bear against a block of eccentrics 20 carried by the shaft 4. The block of eccentrics 20 is mounted in such a manner as to be capable of sliding axially on the shaft 4. And is provided with three primary eccentrics 21, 22 and 23, a first cylindrical concentric cylindrical bearing 24, a fourth or supplemental eccentric 25 and a second cylindrical concentric bearing 26 of larger diameter than the first.

This block 20 also has a groove 27 (FIG. 2) in which engages a finger 28 carried by a slide 29. This slide 29 is guided by two rods 30 and 31 fixed to the base plate 1, said rods engaging in elongated openings 32 of the slide 29. This slide 29 carries a finger 33 adapted to bear against the profile 34 of working distribution cam 35. This cam 35 turns about a spindle 36 carried by the plate 1 and can be displaced by means of an operating member 37 in the form of a lever.

A spring 38, engaged around the rod 30 and bearing on the one hand against a stop 39 and on the other hand, against the finger 33, maintaining the latter in contact with the profile 34 of the cam 35. The profile 34 of this cam 35 thus determines the axial position of the block of eccentrics 20 on the shaft 4.

This block of eccentrics 20 carries two rods 40 located parallel to the shaft 4. Said rods 40 engage in two holes 41 provided in the sleeve 6 and pass through this from one end to the other. These rods 40 thus render the block 20 angularly secured to the driving shaft.

Between the pulley 5 and the sleeve 6 there is engaged freely on the shaft 4 a part 42 of which a part 43 forms a tangential screw gearing with a toothed wheel 44 secured to a shaft 46, rotatably mounted in a bearing 45 provided on the base plate 1. This shaft 46 constitutes the shaft driven by the mechanism for changing the ratio and the direction of transmission. This part 42 also carries a ratchet wheel 47 with which is also adapted to cooperate a pawl 48 carried by the spindle 13 connecting the link 9 to the arm 14.

A second retaining pawl 49 for the ratchet wheel 47 is hinged about a spindle 50 carried by the base plate 1. This pawl 49 carries a peg 51 forming a lateral projection, with which peg is adapted to co-operate a part 52 of the link 9. This part 52, in the form of a ramp or a cam, is adapted to cause the withdrawal of the pawl 49 from the ratchet wheel 47 into a predetermined position of the link 9 so that the two pawls 48 and 49 are withdrawn relatively from the ratchet wheel 47. In fact, in this position shown in FIG. 5, the pawls 48 and 49, which are normally each maintained by a spring in contact with the ratchet wheel 47, are moved away from said wheel.

Figure 5:
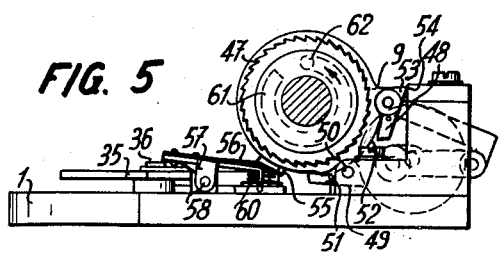
FIG. 5 is a section on the line V—V of FIG. 2.

As will be seen in FIG. 5, an extension 53 of the pawl 48 comes to bear against an adjustable stop 54, stationary relatively to the plate 1, which causes the withdrawal of the pawl 48 from the ratchet wheel 47. As regards the pawl 49, it is maintained spaced from the ratchet wheel 47 by the ramp or cam 52 of the link 9, which ramp acts on the peg 51 of the pawl 49.

Another spring pawl 55 is adapted to act on the ratchet wheel 47 for maintaining this in position. This spring pawl 55 is constituted by a blade 56 secured to a part 57 oscillating about a spindle 58 carried by the plate 1. This spring pawl 55 is adapted to be maintained in active position at the moment at which the end 59 of the slide 29 raises the part 60 of the oscillating part 57. The entry into action of this spring pawl 55 is effected at a determined period of time of the operation of the device for the changing of the ratio and the direction of operation, at which moment there is effected the rigid coupling of the ratchet wheel 47 and the tangential screw 43 with the sleeve 6. This operation is effected with the assistance of the following means:

The ratchet wheel 47 is provided, in its face opposite the sleeve 6, with a circular groove 61 of which the bottom is helicoidal and leads into a bore 62. This bore 62 and this groove 61 are located at a distance from the driving shaft 4 equal to that separating the latter from one of the rods 40. Thus, when moving the block of eccentrics 20 towards the right until it comes to abut against the sleeve 6, one of the rods 40, which is longer than the other, engages by its end 63 in the groove 61 and finally in the bore 62, whereby the tangential screw 43 and the ratchet wheel 47 are coupled rigidly to the tangential screw 43 and thus to the shaft 4. This position of rigid coupling of the tangential screw 43 with the shaft 4 has been shown in FIG. 2, in which it will be seen that for this position, the operating lever 37 is brought opposite the sign "18" of a graduation provided on the base plate 1.

For facilitating the passage of the feeler roller 18 from one eccentric to the other, the assembly of these eccentrics 21, 22 and 23, as also the first cylindrical bearing 24 and the eccentric 25 are disposed in such a manner as to have a common prolonged generatrix 65 (see FIG. 2). The eccentric 25 has an eccentricity equal to the difference of the diameters of the two cylindrical bearings 24 and 26, so that two generatrices diametrically opposed to this eccentric 25 are common respectively to the two cylindrical bearings 24 and 26 for facilitating the passage of the feeler roller 18 from one bearing to the other.

The functioning of the device for the changing of the ratio and the direction of transmission described above with reference to the drawing, takes place in the following manner:

When the operating member 37 is moved into the position marked "18" on the graduation 64, the pawls 48 and 49 are moved away from the ratchet wheel 47, and the tangential screw 43 is connected rigidly to the driving shaft 4 through the medium of one of the rods 40 passing through the sleeve 6 and engaging in the bore 62 of the ratchet wheel 47. In this position, shown in FIG. 2, the driven shaft 46 is driven in continuous rotation from the driving shaft 4 in the direction of the arrow at a given rate by the gears 43 and 44.

When the operating member 37 is moved from the position "18" to the position "0" of the graduation 64, there is caused by the cam 35 a movement of the block of eccentrics 20 towards the left, until the feeler roller 18 comes into contact with the cylindrical and concentric bearing 24. In this position of the feeler roller 18, the link 9 moves slightly relative to its primary position and permits the pawls 48 and 49 to come into contact with the ratchet wheel 47 so as to lock this. In this position "0," the driving shaft 4 does not transmit any movement to the tangential screw 43 which is held locked by the pawls 48 and 49.

When the operating member 37 is moved from the position "0" to the position "216," "162" or "108," the block of eccentrics moves away from the sleeve 6 and the feeler 18 comes into contact successively with the eccentric 23, the eccentric 22 and finally the eccentric 21 for the position "108." This position is shown in FIG. 3 in position "108" of the operating member 37. The respective eccentrics 23, 22 and 21 impart to the feeler roller 18 a movement of oscillation which is transmitted to the pawl 48 and causes the driving in jerks of the ratchet wheel 47, and thus to the tangential screw 43. The driven shaft 46 is thus driven in the direction of the arrow in an intermittent movement of rotation, the ratio of which depends on which of the eccentric 21, 22 or 23 comes into action.

Figure 4:
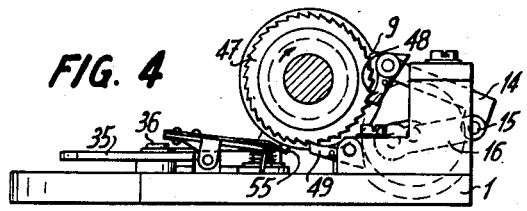
FIG. 4 is a section on the line IV—IV of FIG. 3.

The withdrawal of the pawl 48 and maintenance of the feeler roller 18 in contact with the corresponding eccentric is effected by reason of the friction means formed by the elastic washer 12 which gives rise to a driving couple of the link 9 by the driving shaft. As will be observed, particularly by examination of FIG. 4, the disposition of the pawl 48 is such that the driving of the ratchet wheel thereby is effected in the direction opposite the rotation of the driving shaft 4. Thus the device described with reference to the drawing permits of three different ratios of drive of the shaft 46 by the driving shaft 4, while the ratchet wheel 47 is driven in a direction reversely to that of the rotation of the shaft 4, and at a ratio of driving in continuous rotation of the shaft 46, while the tangent screw 43 is rendered solid with the shaft 4 and turns in the same direction as the latter.

The spring pawl 55 is only active during the transition operation, when the operating member 37 is moved from the position "0" to the position "18" for effecting the rigid coupling of the tangential screw 43 to the sleeve 6 by the engagement of the extremity 63 of the rod 40 in the groove 61 and the bore 62 of the ratchet wheel 47.

The construction of this device for the changing of the ratio and the direction of the transmission is such that the operating member 37 of this may be manipulated without any precaution during the driving of the shaft 4, the different ratios being engaged automatically according to the position given to the operating member 37.

The device described above is more particularly adapted to be mounted in a sewing machine forming the subject of our copending patent application previously referred to. In this application the shaft 46 is adapted to drive the cams controlling the transverse movements of the needle bar of the sewing machine. When the operating member 37 is located in the position "18" the control cam engaged at this moment on the sewing machine causes, during a complete revolution, eighteen sewing stitches which may be situated in different lateral positions relative one to the other, a zig-zag stitch, or an ornamental stitch, and so forth. On the contrary, when the operating member is maintained in one of the positions "108," "162" or "216," the control cams carried by the shaft 46 cause a cycle of sewing stitches which are repeated after one hundred and eight, one hundred and sixty-two or two hundred and sixteen stitches respectively, pricked by the needle, which permits, for example, the formation of monograms or other embroidery stitches, button holes and so forth.

We claim:

1. In a sewing machine including a driving shaft and a driven shaft, means for changing the ratio and the direction of transmission between said driving (4) and driven (46) shafts, and imparting an intermittent motion to said driven shaft, said means comprising a block (20) of eccentrics (21, 22, 23) and cylindrical bearings (24, 26) secured to said driving shaft and slidable thereon, said eccentrics and said cylindrical bearings disposed relative to each other such that one of their generatrices coincides, an operating member (37) controlling the axial movements of said eccentrics, a feeler member (18) adapted to bear against a selected one of said eccentrics, a pawl (48), means (13, 9, 14, 15, 16, 17, 19) connecting said pawl to said feeler member, the movement of said feeler member relative to one of said eccentrics being transmitted to said pawl to impart an oscillating movement thereto, the amplitude of such movement depending on the eccentricity of the eccentric in operation, a ratchet wheel (47) coperating with said pawl, gear means (43, 44) connecting said ratchet wheel to said driven shaft (46) said cylindrical bearings (24, 26) being of larger diameter than said eccentrics, the diameter of the first cylindrical bearing (24) being such that when said feeler member (18) is in engagement therewith, said pawl (48) is moved to a position in engagement with said ratchet wheel (47) to prevent it from rotating, said second concentric cylindrical bearing (26) being of a diameter larger than said first cylindrical bearing (24) and adapted to cause the withdrawal of said pawl from engagement with said ratchet wheel (47) when said feeler member (18) cooperates with said second cylindrical bearing (26), coupling means (6, 40, 41, 61, 62, 63) for selectively coupling said block (20) with said ratchet wheel (47), said coupling means being engaged when said block (20) is moved axially whereby said feeler member (18) engages said second cylindrical bearing (26) so as to obtain a direct transmission of the forces of said driving shaft (4) to said driven shaft (46) through said gear means.

2. A device according to claim 1, wherein a supplemental eccentric (25) is located between said two cylindrical concentric bearings (24, 26), the eccentricity of said supplemental eccentric being equal to the difference of the diameters of said two cylindrical bearings, so that the diametrically opposed two generatrices of said eccentric are common respectively to said two cylindrical bearings so as to faciltate the passage of said feeler member (18) from one cylindrical bearing to the other.

3. A device according to claim 1, wherein a sleeve (6) is secured to said driving shaft (4) for rotation therewith, said sleeve located between said ratchet wheel and said block of eccentrics and having at least one hole (41) therethrough, said eccentrics carrying at least one rod (40) disposed parallel to said driving shaft (4) and engaged in one of said holes, said ratchet wheel (48) being provided, in its face opposite said sleeve, with a circular groove (61) the bottom of which is helicoidal and leads into a bore (62), said groove (61) located at a distance from said driving shaft (4), equal to the distance separating said shaft from said rod (40), so as to receive the extremity (63) of said rod during the rigid coupling of said ratchet wheel to said eccentric block.

4. A device according to claim 3, including a link (9) located on said sleeve (6), friction means (12) connecting said link to said sleeve, said link being connected by an arm (14) to a lever (16) carrying said feeler member (18), a spindle (13) connecting said link (9) to said arm carrying said pawl (48), the return movement of said pawl being effected by the driving of said link (9) by said sleeve (6) under the action of said friction means (12).

References Cited in the file of this patent
UNITED STATES PATENTS

| | | |
|---|---|---|
| 1,427,223 | Miller | Aug. 29, 1922 |
| 2,797,795 | West | July 2, 1957 |